2,970,071

REMOVAL OF COLORED BODIES FROM AQUEOUS CRUDE SUGAR SOLUTIONS

Leonard J. Lefevre and William I. Childs, Midland, Mich., assignors to The Dow Chemical Company, Midland, Mich., a corporation of Delaware No Drawing. Filed Feb. 19, 1959, Ser. No. 794,238

3 Claims. (Cl. 127—46)

This invention concerns a method for removing colored bodies from an aqueous crude sugar solution wherein the crude solution is contacted with a water-insoluble resin which preferentially absorbs and removes colored bodies therefrom.

It has now been discovered in accordance with this invention that an aqueous crude sugar solution containing colored bodies can be contacted with an N-methylglucamine-substituted resin which preferentially absorbs and removes the colored bodies to give an aqueous sugar solution of high clarity and low color. By sugar, as used herein, is meant the monosaccharides and disaccharides, such as fructose, glucose, lactose, maltose, sucrose, etc.

The N-methylglucamine (hereafter abbreviated as NMG) resin used in the practice of this invention is a water-insoluble crosslinked copolymer of a mixture of a monovinylaryl hydrocarbon having the vinyl group as its sole aliphatic unsaturation (preferably styrene) and a copolymerizable crosslinking agent which contains at least $2CH_2:C:$ groups (preferably divinylbenzene, hereafter abbreviated as DVB) the crosslinking agent being present in molar amounts equal to 0.2 to 20 percent of said monovinylaryl hydrocarbon having —$CH_2$—NMG groups attached to the aryl nuclei thereof.

Although this resin was known and previously used to absorb and remove borate ions from aqueous fluids, its utility in removing colored bodies from aqueous crude sugar solutions was not obvious therefrom. The reason for its effectiveness for removing color bodies is not known.

In practice, an aqueous crude sugar solution containing colored bodies is contacted with NMG resin in salt or basic form. The surrounding liquor is then withdrawn from the resin to give an aqueous sugar solution of high clarity and low color. The colored bodies can thereafter be stripped from the resin and the resin thereby regenerated, advantageously by contact with dilute mineral acid, or with dilute aqueous alkali. If desired, a mild oxidizing agent, such as aqueous dilute (0.25 percent) hypochlorite can also be used, preferably in combination with dilute aqueous alkali to regenerate the resin.

The following examples describe specific embodiments of this invention and represent the best mode contemplated for carrying out the invention.

Example 1

A quantity of 25 ml. of 50–100 mesh —$CH_2$—NMG- substituted styrene-DVB copolymer containing about 2 weight percent combined DVB (similar to products taught in U.S. Patent 2,813,838) was placed in a 100 ml. burette containing a glass wool plug in the bottom and rinsed with deionized water. A solution consisting of 50 g. "B" molasses, beet sugar source, was diluted to 1000 g. with deionized water and filtered with the aid of a filter cell in a Buchner funnel. Its National Bureau of Standards color number (Jl. of Research of the National Bureau of Standards, vol. 57, No. 3, p. 159, September 1956) was considerably higher than 50. A quantity of 200 ml. thereof was flowed through the resin bed. Effluent was collected in a bottle for spectrophotometric analysis. It had a National Bureau of Standards (N.B.S. hereinafter) color number of 30, and was clear and colorless by visual observation. Following a water rinse, the resin was then regenerated with 50 ml. of aqueous 5 percent sodium hydroxide, rinsed with water, treated with 30 ml. of aqueous 0.25 weight percent sodium hypochlorite solution to remove remaining small amounts of color bodies and water rinsed.

Example 2

The regenerated resin from Example 1 was contacted with 200 ml. of the diluted molasses solution indicated above. The effluent then had an N.B.S. color number of 8, and was clear and colorless by visual observation. Following a water rinse thereafter, the resin was treated with 100 ml. of aqueous 5 weight percent of ammonium hydroxide solution.

Example 3

The regenerated resin from Example 2 was contacted with 200 ml. of the diluted molasses solution indicated above. The effluent therefrom had an N.B.S. color number of 24, and was pale yellow by visual observation.

What is claimed is:

1. The method for preferentially absorbing and removing colored bodies from an aqueous crude sugar solution which method comprises contacting said solution with an insoluble crosslinked copolymer of a mixture of a monovinylaryl hydrocarbon having the vinyl group as its sole unsaturation and a copolymerizable crosslinking agent which contains at least 2 groups of the structure $CH_2:C:$, said crosslinking agent being present in molar amount equal to 0.2 to 20 percent of said monovinylaryl hydrocarbon, said copolymer having attached to the aryl nuclei thereof —$CH_2$—N-methylglucamine groups and removing the surrounding sugar solution from said copolymer.

2. The method of claim 1, wherein the monovinylaryl hydrocarbon is styrene and the crosslinking agent is divinylbenzene.

3. The method of claim 1, wherein the sugar is sucrose.

References Cited in the file of this patent

UNITED STATES PATENTS

| | | |
|---|---|---|
| 2,785,998 | Harding | Mar. 19, 1957 |
| 2,813,838 | Lyman | Nov. 19, 1957 |
| 2,874,132 | Reiner | Feb. 17, 1959 |